Oct. 26, 1937.  W. F. STARR  2,097,352
WEATHER STRIPPING
Filed Sept. 11, 1936   2 Sheets-Sheet 1

Inventor
W. F. Starr
By Clarence A. O'Brien
Hyman Berman
Attorneys

Oct. 26, 1937.    W. F. STARR    2,097,352
WEATHER STRIPPING
Filed Sept. 11, 1936    2 Sheets-Sheet 2
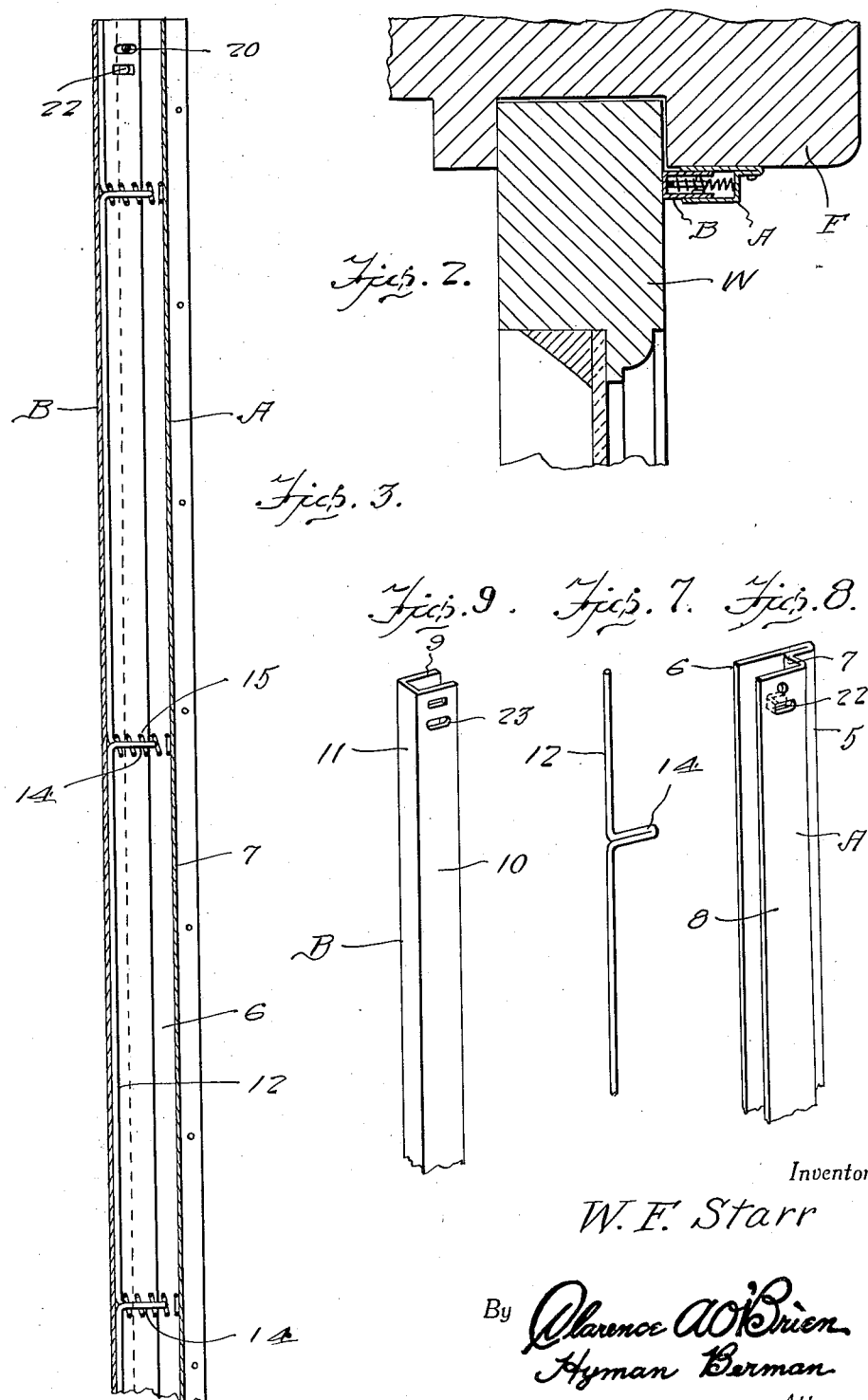
Inventor
W. F. Starr
By Clarence A. O'Brien
Hyman Berman
Attorneys Patented Oct. 26, 1937

2,097,352

UNITED STATES PATENT OFFICE 2,097,352

WEATHER STRIPPING

William Francis Starr, Chicago, Ill.

Application September 11, 1936, Serial No. 100,365

1 Claim. (Cl. 20—68)

The present invention relates to weather stripping to be used for windows, doors and the like and has for its object to provide self compensating stripping which is simple in construction, inexpensive to manufacture and install, efficient and reliable in use, durable and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

Figure 2 is a sectional view taken substantially on the line 2—2 of Figure 1.

Figure 3 is a longitudinal section through the stripping.

Figure 1:
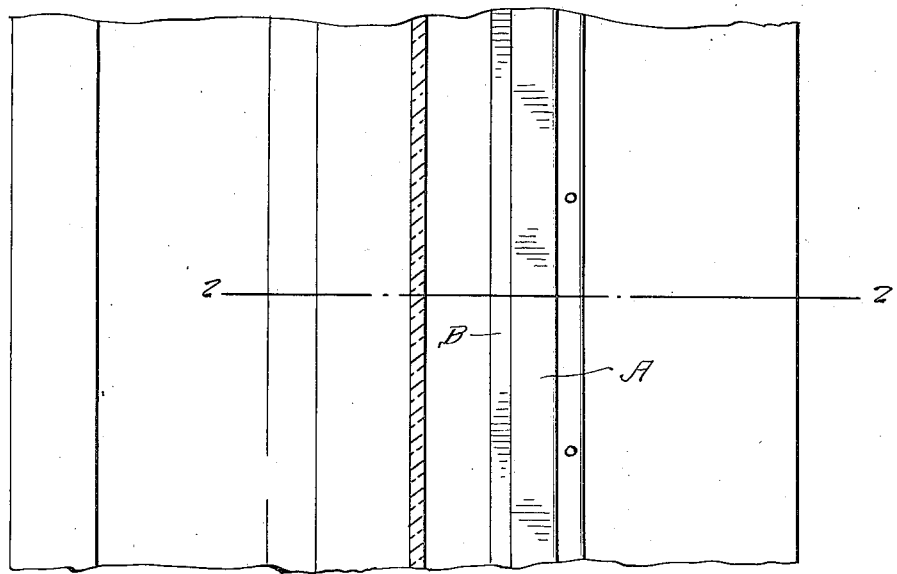
Figure 1 is a side elevation of a portion of weather stripping embodying features of my invention.
Figure 4:
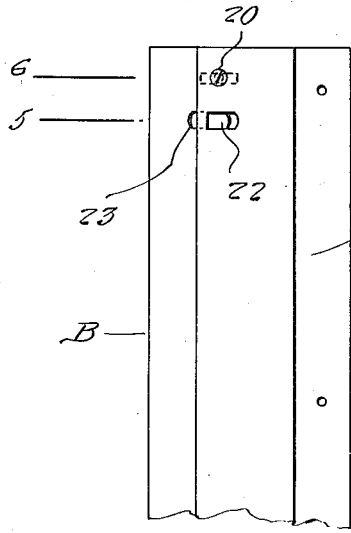
Figure 4 is an enlarged detail elevation of one end of the stripping.
Figure 5:
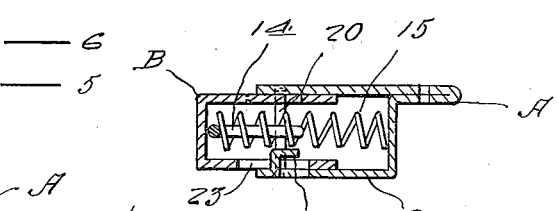
Figure 6:
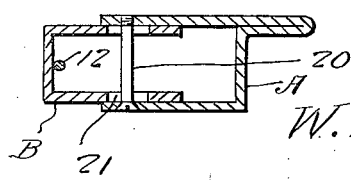

Figures 5 and 6 are sections taken on the line 5—5 and line 6—6 of Figure 4.

Figure 7 is a perspective view of a rod used in connection with the stripping.

Figure 8 is a fragmentary perspective of another section of the stripping.

Figure 9 is a fragmentary perspective in one section of the stripping.

Referring to the drawings in detail it will be seen that the letter A denotes one section of the stripping which is of channel formation being made from sheet metal or the like and formed with the flange 5 extending from one side 6 outward from the back or cross portion 7. The numeral 8 denotes the other side.

Letter B denotes the other section which is U-shaped formation including sides 9 and 10 and cross portion 11. Section E is adapted to telescope into the section A as clearly shown in Figures 2, 5 and 6. A rod 12 is mounted in the section B and at intervals is formed with fingers 14 over which are disposed springs 15 which bear against the section. Section A is fixed to the frame F by screws or the like adjacent the window W. The springs hold the section D against the window thereby forming efficient weatherstripping. Of course the apparatus may be used in other ways. At the ends of the stripping there are screws 20 in the sides 6 and 8 of section A which pass through slots 21 in the sides of section B. In side 8 of section A there is a lip bent therefrom denoted by the numeral 22 and it extends through a slot 23 inside 10 of section B.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention what I claim as new is:—

Weather stripping comprising a pair of sections both being substantially U-shaped in formation and being telescopically associated, one section being adapted for mounting on a frame while the other section is adapted to bear against window, door or the like, spring means between the sections holding the second section in engaging position, said spring means comprising a rod fixed in the second mentioned section and having laterally bent portions formed as a continuation of the rod and constituting fingers directed toward the first mentioned section and coil springs on said fingers.

WILLIAM FRANCIS STARR.